(12) United States Patent
Sakai et al.

(10) Patent No.: US 8,249,293 B2
(45) Date of Patent: Aug. 21, 2012

(54) METHOD, APPARATUS AND COMPUTER-READABLE RECORDING MEDIUM FOR OBTAINING INFORMATION

(75) Inventors: Kenichiro Sakai, Kawasaki (JP); Tsugio Noda, Hadano (JP)

(73) Assignee: Fujitsu Limited, Kawasaki (JP)

( * ) Notice: Subject to any disclaimer, the term of this patent is extended or adjusted under 35 U.S.C. 154(b) by 973 days.

(21) Appl. No.: 12/073,368

(22) Filed: Mar. 4, 2008

(65) Prior Publication Data

US 2008/0219568 A1    Sep. 11, 2008

(30) Foreign Application Priority Data

Mar. 5, 2007 (JP) .................................. 2007-054767

(51) Int. Cl.
  *G06K 9/00* (2006.01)
  *G06K 9/36* (2006.01)
  *G06K 9/46* (2006.01)
(52) U.S. Cl. .................. 382/100; 382/232; 382/239
(58) Field of Classification Search .................. 382/100, 382/232, 239
See application file for complete search history.

(56) References Cited

U.S. PATENT DOCUMENTS

| | | | |
|---|---|---|---|
| 6,185,312 B1* | 2/2001 | Nakamura et al. | 382/100 |
| 2004/0234139 A1 | 11/2004 | Moroo et al. | |
| 2005/0117774 A1* | 6/2005 | Moroo et al. | 382/100 |
| 2006/0110005 A1 | 5/2006 | Tapson | |
| 2007/0133857 A1* | 6/2007 | Wang et al. | 382/133 |
| 2007/0230826 A1* | 10/2007 | Moroo et al. | 382/295 |

FOREIGN PATENT DOCUMENTS

JP    2004-349879    12/2004

OTHER PUBLICATIONS

Polikar, R.—"Ensemble of Classifiers Based Incremental Learning with Dynamic Voting Weight Update"—2003—IEEE, pp. 2770-2775.*
Chinese Patent Office Action issued Dec. 11, 2009 for corresponding Chinese Patent Application No. 200810082067.9.

* cited by examiner

*Primary Examiner* — Bernard Krasnic
(74) *Attorney, Agent, or Firm* — Staas & Halsey LLP

(57) ABSTRACT

A method of obtaining information included in an image, the method includes dividing the image into a plurality of pairs of blocks. The image includes a plurality of codes. Each of the codes includes a plurality of digits. The method further includes determining a digit value of each of the block pairs on the basis of difference of a degree of characteristic value between adjacent blocks in each of the pairs. The method further includes weighing each digit value of each of the block pairs. The method further includes deciding a new digit value of associated pairs of blocks on the basis of the majority of the weighed digit values of the associated pairs of the blocks and repeating the deciding in other associated pairs of the blocks to determine the code.

16 Claims, 11 Drawing Sheets

Fig. 6

| Absolute Dk of the difference between the average pixel values forming the pair of blocks | | | | | |
|---|---|---|---|---|---|
| D1 | D2 | D3 | ... | ... | Dn |

| Number of times of the correct solution | Number of obtaining times |
|---|---|
| C1 | N1 |
| C2 | N2 |
| C3 | N3 |
| ... | ... |
| ... | ... |
| Cn | Nn |

↖ Data on the correct-solution frequency

METHOD, APPARATUS AND COMPUTER-READABLE RECORDING MEDIUM FOR OBTAINING INFORMATION

CROSS-REFERENCE TO RELATED APPLICATION

This application is based upon and claims the benefit of priority of the prior Japanese Patent Application No. 2007-054767, filed on Mar. 5, 2007 the entire contents of which are incorporated herein by reference.

BACKGROUND

1. Field

The present technique relates to an image processing apparatus and the like that divide an image into a plurality of blocks, extract a code correlated with a pair of blocks on the basis of the amount of characteristics of the individual blocks forming the pair of blocks every pair of blocks, and determine a series of codes embedded to the image plural times. In particular, the present technique relates to an image processing apparatus and an image processing method that improve decoding performance by reducing errors after the majority vote.

2. Description of the Related Art

A document of the conventional art is disclosed in Japanese Unexamined Patent Application Publication No. 2004-349879.

SUMMARY

A method of obtaining information included in an image, the image including a plurality of codes, each of the codes comprising a plurality of digits, the method comprises dividing the image into a plurality of pairs of blocks, determining a digit value of each of the block pairs on the basis of difference of a degree of characteristic value between adjacent blocks in each of the pairs, weighing each digit value of each of the block pairs, deciding a new digit value of associated pairs of blocks on the basis of the majority of the weighed digit values of the associated pairs of the blocks and repeating the deciding in other associated pairs of the blocks to determine the code.

BRIEF DESCRIPTION OF THE DRAWINGS

FIG. 6 is a diagram showing another data structure of the data on the correct-solution frequency;

DESCRIPTION OF THE PREFERRED EMBODIMENTS

Hereinbelow, a specific description will be given of an image processing apparatus and an image processing method according to preferred embodiments of the present technique with reference to the drawings.

In order to prevent forgery and abuse and provide additional services, a technology for embedding an arbitrary code to an image and a technology for extracting the code embedded to the image with the above technology are devised, and are put into practice.

An object of a method for determining a code by performing the majority vote and is to correct a partial error of the extracted code, upon iteratively embedding the same code to the image and extracting the code from the image. That is, this is based on such an idea that, if there is a large amount of correct codes in the plurality of codes extracted from the image, even when the code is partly erroneous, the majority vote enables the correct code to be obtained.

Figure 10:
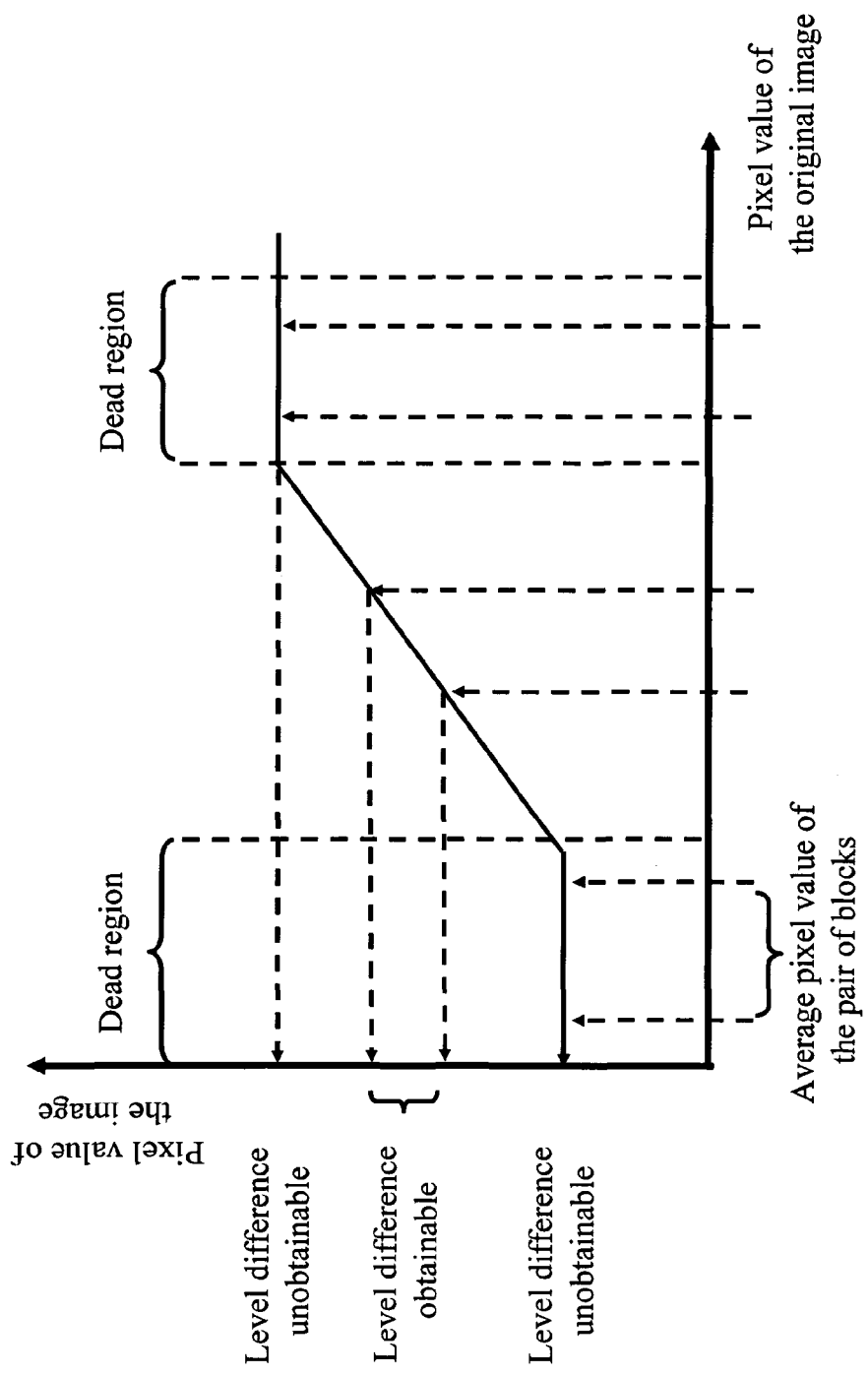
FIG. 10 is a diagram (1) for illustrating a problem.
Figure 11:
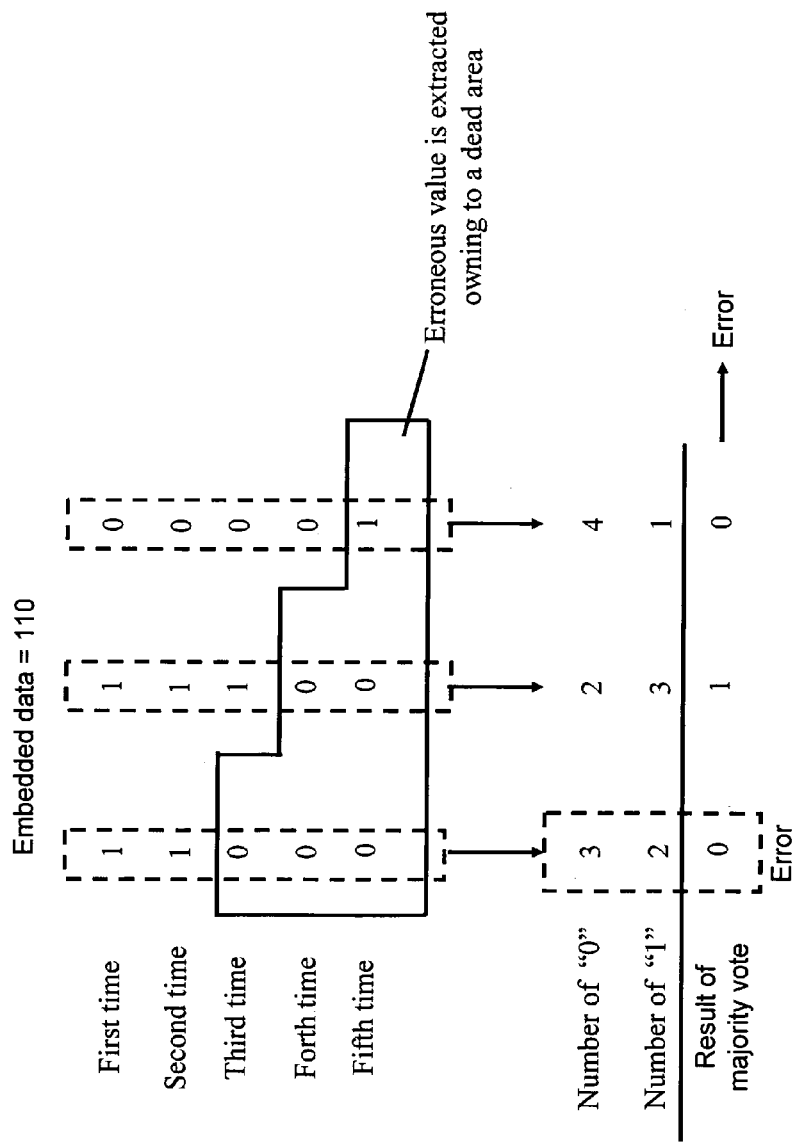
FIG. 11 is a diagram (2) for illustrating the problem.

However, there is a problem that the data embedded to the image cannot be precisely extracted. FIGS. 10 and 11 are diagrams for illustrating the problem.

Referring to FIG. 10, an image to which a code is embedded is printed to paper, and is inputted with an input device such as a camera. Then, depending on the non-linearity of input characteristics of the printing or input device, such a region is caused that the difference between average pixel values of the pair of blocks in the image input is flat on a shot image. Hereinafter, the region in which the difference between the average pixel values of the pair of blocks in the input image is flat on the shot image is expressed as a dead region. Incidentally, as the pixel value is larger, the image is closer to white. On the other hand, as the pixel value is smaller, the image is close to black.

If the average pixel value of the pair of blocks enters the dead region, the difference in average pixel values of the pair of blocks is "0", the size relationship is inverted due the influence of minute noises, and the decoding is not correctly performed with high possibility. Therefore, if there is a large amount of the pair of blocks included in the dead region, the code different from the code actually-embedded to the image is extracted even with the majority vote, thereby failing the decoding.

FIG. 11 shows an example in which data "110" having 3 bits is embedded to the image five times. In a portion surrounded by a thick line shown in FIG. 11, the pixel value of the pair of blocks is within the dead region, and an erroneous value is extracted. At the most significant bit, the number of pairs of blocks for which 1 is correctly obtained is two and the number of pairs of blocks for which another value is erroneously obtained is three. As the consequence of the majority vote, 0 as an erroneous value is selected. As mentioned above, when the appearance frequency of the erroneous value is high, the erroneous value is selected and the correct decoding is not performed.

In general, in order to improve the reliability of the decoding result, the embedding and decoding of the code are performed with combination of the majority vote and error correction. Upon using the error correction, the data obtained by adding data for error correction to the original data is iteratively embedded to the image, and the error correction is executed after the majority vote in the decoding time, thereby correcting the error to some degree.

However, if the number of pair of blocks included in the dead region is larger and the number of errors after the majority vote is increased over an error correcting range, the error correction is not executed and the code embedded to the image is not extracted.

First Embodiment

First of all, a description will be given of the outline and features of the image processing apparatus according to the first embodiment of the present technique. With the image processing apparatus according to the first embodiment, upon obtaining an image to which a series of codes are embedded plural times, the image is divided into a plurality of blocks, and the code is detected on the basis of the amount of characteristics forming a pair of blocks. Further, information on correct-solution frequency indicating the correct-solution frequency of the code correlated with the pair of blocks is obtained.

With the image processing apparatus, the weight to the pair of blocks is determined on the basis of the information on the correct-solution frequency, the code correlated with the pair of blocks is weighted to perform the majority vote, and a series of codes embedded to the image are determined. The image includes a plurality of codes, each of the codes comprising a plurality of digits. Herein, the weighting to the code correlated with the pair of blocks means that the code is weighted with the weight corresponding to the pair of blocks.

As mentioned above, with the image processing apparatus according to the first embodiment, the weight of the pair of blocks is determined from the correct-solution frequency corresponding to the amount of characteristics of the pair of blocks, and the code correlated with the pair of blocks is weighted by using the determined weight. Moreover, with the image processing apparatus according to the first embodiment, a series of codes embedded to the image are determined by executing the majority vote, thereby reducing the number of errors after the majority vote and improving the decoding performance.

Incidentally, according to the first embodiment, the amount of characteristics of the block (image) indicates the amount of characteristics obtained from the image, such as the average density, average pixel value, granularity, chroma, barycentre of density, and variance. The decoding may be executed by using any of the amounts of characteristics and, alternatively, the decoding may be executed by mixedly using the amounts of characteristics.

In addition, as a method for embedding a series of codes to an image by dividing the image into a plurality of blocks and adjusting the amount of characteristics of the individual blocks forming a pair of blocks, a method disclosed in Japanese Unexamined Patent Application Publication No. 2004-349879 may be used. With the method disclosed in Japanese Unexamined Patent Application Publication No. 2004-349879, a series of codes can be embedded to the image plural times. Moreover, it is assumed that a series of codes include an error correction code for correcting the code. Herein, the error correction code means, e.g., a BCH (Bose Ray-Chaudhuri Hocquenghem) code.

Figure 1:
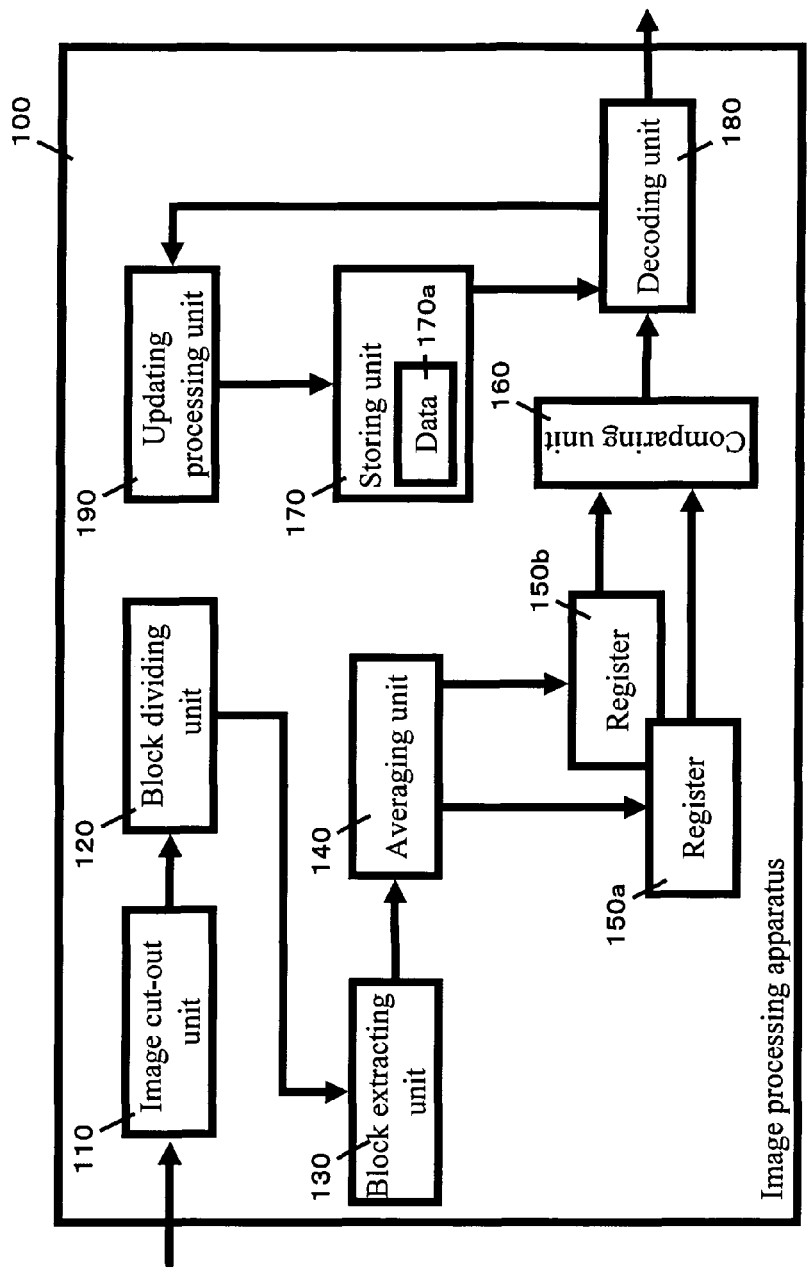
FIG. 1 is a functional block diagram showing the structure of an image processing apparatus according to the first embodiment.

Next, a description will be given of the structure of the image processing apparatus according to the first embodiment. FIG. 1 is a functional block diagram showing the structure of the image processing apparatus according to the first embodiment. Referring to FIG. 1, an image processing apparatus 100 comprises: an image cut-out unit 110; a block dividing unit 120; a block extracting unit 130; an averaging unit 140; registers 150$a$ and 150$b$; a comparing unit 160; a storing unit 170; a decoding unit 180; and an updating processing unit 190.

Among the components, the image cut-out unit 110 obtains data on the image to which code is embedded from an input device such as a camera or scanner. Herein, the image to which the code is embedded means an image to which a series of codes including the error correction code are iteratively embedded. Hereinafter, the data on the image to which the code is embedded is expressed as image coding data. If the image coding data includes cut-out data such as margin data, the image cut-out unit 110 cuts-out effective image coding data from the whole image. The image cut-out unit 110 outputs the cut-out image coding data to the block dividing unit 120. The image cut-out unit 110 is a processing unit for performing the above processing.

The block dividing unit 120 is a processing unit that creates block dividing image data, obtained by dividing the image coding data into a plurality of blocks, when the image coding data is obtained from the image cut-out unit 110. The block dividing unit 120 divides the image coding data into N rows×M columns where N and M denote counting numbers. The block dividing unit 120 outputs the block dividing image data to the block extracting unit 130.

The block extracting unit 130 sequentially extracts the pair of blocks from the block dividing image data by following the bit shift of the code as a decoding target. Herein, the pair of blocks means two blocks. Further, the block extracting unit 130 sets the amount of characteristics, e.g., a distribution value of pixels in the pair of blocks, as data on the block pixel value, and sequentially outputs the data on the block pixel value to the averaging unit 140. The block extracting unit 130 is a processing unit that performs the above processing.

Herein, the bit shift of the code means that a bit pointer shifts to the right bit by bit from the leftmost bit to the right bit in a series of codes (bits). For example, when a series of codes are "101", the pointer shifts from "1" to the right, i.e., "0" and "1".

The averaging unit 140 is a processing unit that obtains, from the data on the block pixel value, data on the average density of the left side indicating an average pixel value of the image corresponding to one block of the pair of blocks and data on the average density of the right side indicating an average pixel value of the image corresponding to the other block of the pair of blocks. The averaging unit 140 sequentially stores the data on the average density of the left side to the register 150$a$, and further sequentially stores the data on the average density of the right side to the register 150$b$ by following the bit shift of the code.

The comparing unit 160 is a processing unit that determines the code correlated with the pair of blocks on the basis of the data on the average density of the left side stored in the register 150$a$ and the data on the average density of the right side stored in the register 150$b$. Specifically, if a relationship between a pixel value of the left side and a pixel value of the right side is as follows, that is, Pixel value of the left side<Pixel value of the right side . . . (A), the comparing unit 160 determines, as "1", the code correlated with the pair of blocks.

Further, if the relationship between the pixel value of the left side and the pixel value of the right side is as follows, that is, Pixel value of the left side>Pixel value of the right side . . . (B), the comparing unit 160 determines, as "0", the code correlated with the pair of blocks. Furthermore, if the relationship between the pixel value of the left side and the pixel value of the right side is as follows, that is, Pixel value of the left side=Pixel value of the right side . . . (C), the comparing unit 160 determines, as "unknown", the code correlated with the pair of blocks.

The amount of characteristics, such as the average pixel value, and the conditions (A) and (B) used in the decoding need to be the same as those used upon embedding the code. Moreover, if the average pixel values of the left and right blocks forming the pair of blocks are equal to each other, corresponding to the condition (C), the comparing unit 160 determines, as "unknown", the code, and excludes the code from the targets of the majority vote. Further, any of "0" and "1" may be always assigned to the codes and, alternatively, "0" and "1" may be alternately assigned to the codes.

The comparing unit 160 sequentially outputs the code, as the determination result, to the decoding unit 180. Further, the comparing unit 160 sets the pixel value of the left side and the pixel value of the right side of the pair of blocks, corresponding to the code, as the data on the left and right pixel values and outputs them to the decoding unit 180. That is, the comparing unit 160 outputs, to the decoding unit 180, the code as the determination result and the data on the left and right pixel values corresponding to the code.

Figure 2:
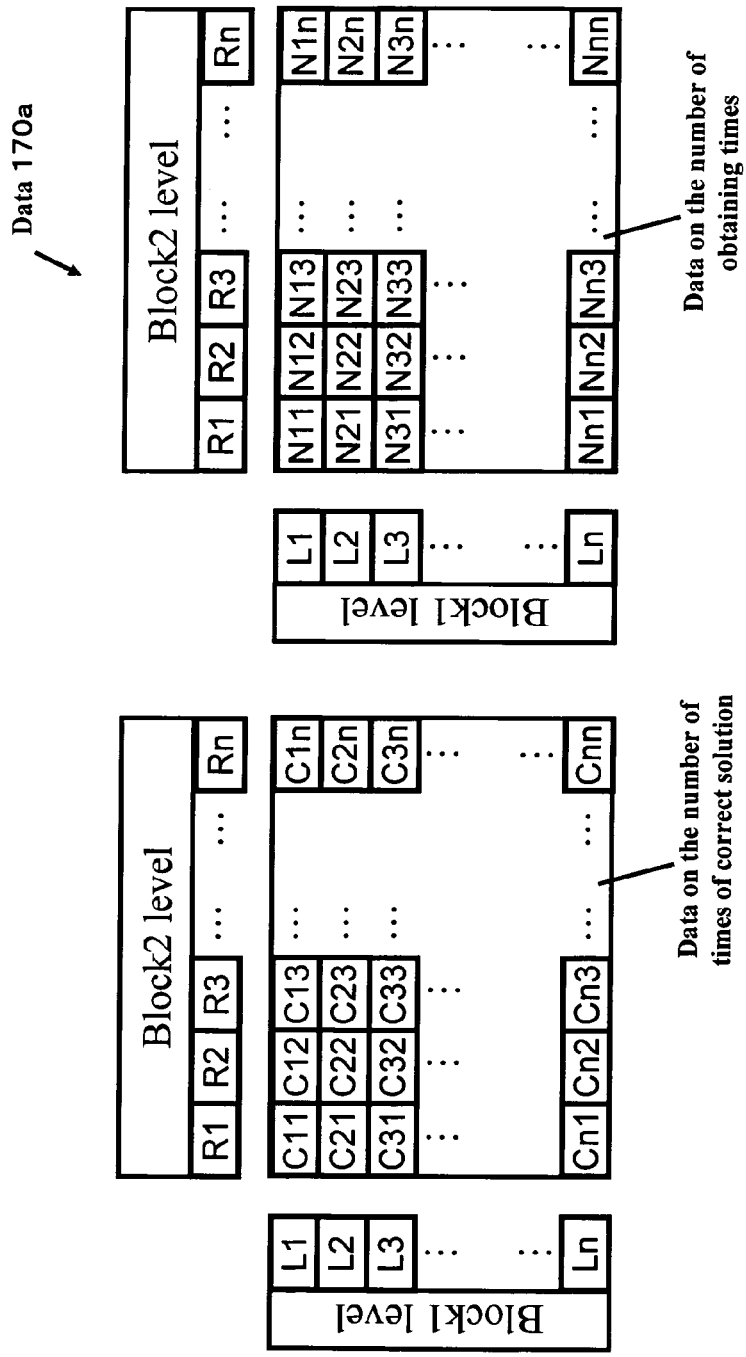
FIG. 2 is a diagram showing one example of the data structure of data on the correct-solution frequency.

The storing unit 170 is a storing unit that stores data 170a on the correct-solution frequency. Herein, the data 170a on the correct-solution frequency is data for storing a correct solution ratio, determined from information on the frequency of the correct solution of the code determined by the comparing unit 160 or a code ratio of the code determined from the average pixel value of the pair of blocks. Incidentally, the decoding unit 180, as will be described later, determines whether or not the code determined by the comparing unit 160 is a correct solution. FIG. 2 is a diagram showing one example of the data structure of the data 170a on the correct-solution frequency.

Referring to FIG. 2, the data 170a on the correct-solution frequency includes data on the number of times of correct solution and data on the number of obtaining times. First, a description will be given of the data on the number of times of correct solution expressed on the left side of FIG. 2. Blocks forming the pair of blocks are referred to as blocks 1 and 2. Then, the data on the number of times of correct solution includes an average pixel value Li (i=1 to n where n is a counting number) of the block 1, an average pixel value Rj (j=1 to n where n is a counting number) of the block 2, and a number Cij of times of correct solution corresponding to the average pixel values (the average pixel value Li corresponds to the pixel value of the left side and the average pixel value Rj corresponds to the pixel value of the right side).

If determining the code determined by the comparing unit 160, as the correct solution, on the basis of the pixel value of the left side and the pixel value of the right side corresponding to the average pixel value Li and the average pixel value Rj, a predetermined value is added to a value of the number Cij of times of correct solution corresponding to the average pixel value Li and the average pixel value Rj. On the other hand, if not determining the code determined by the comparing unit 160, as the correct solution, on the basis of the pixel value of the left side and the pixel value of the right side corresponding to the average pixel value Li and the average pixel value Rj, the value of the number Cij of times of correct solution corresponding to the average pixel value Li and the average pixel value Rj is not changed.

Subsequently, a description will be given of the data on the number of obtaining times expressed on the right side of FIG. 2. Blocks forming the pair of blocks are referred to as blocks 1 and 2. Then, the data on the number of obtaining times includes the average pixel value Li (i=1 to n where n is a counting number) of the block 1, the average pixel value Rj (j=1 to n where n is a counting number) of the block 2, and a number Nij of obtaining times corresponding to the average pixel values. The average pixel value Li corresponds to the pixel value of the left and the average pixel value Rj corresponds to the pixel value of the right side.

The number Nij of obtaining times indicates the number of times for obtaining the data on the left and right pixel values from the comparing unit 160 by the decoding unit 180. A predetermined value is added to a value of the number Nij of obtaining times in accordance with the number of times for obtaining the data on the left and right pixel values by the decoding unit 180. Herein, the value of the number Nij of obtaining times is a value of the number Nij of obtaining times corresponding to the average pixel value Li and the average pixel value Ri corresponding to the data on the left and right pixel values.

The correct-solution frequency corresponding to the average pixel value Li and the average pixel value Ri can be calculated on the basis of the data on the number of times of correct solution and the data on the number of obtaining times shown in FIG. 2. Specifically, a correct-solution frequency Sij corresponding to the average pixel value Li and the average pixel value Rj can be calculated by the following expression.

Correct-solution frequency $Sij=Cij/Nij$

The description is back to that of FIG. 1. The decoding unit 180 is a processing unit that determines a series of codes embedded to the image coding data on the basis of the code obtained from the comparing unit 160, the data on the left and right pixel values, and the data 170a on the correct-solution frequency of the storing unit 170.

Herein, a specific description will be given of the processing of the decoding unit 180. First, the decoding unit 180 sequentially obtains the code from the comparing unit 160, and stores the obtained code to a temporary storing unit (not shown) for each of series of codes. If iteratively embedding a code having 3 bits to the image coding data five times, five codes each having 3 bits are stored to the temporary storing unit. Upon storing the codes on one series to the temporary storing unit, the decoding unit 180 stores the codes with the correlation with the data on the left and right pixel values.

Further, the decoding unit 180 compares the data on the left and right pixel values correlated with the code with the data on the number of times of correct solution and the data on the number of obtaining times in the data 170a on the correct-solution frequency, and calculates the correct-solution frequency of the code. According to the first embodiment, the decoding unit 180 sets the correct-solution frequency as the weight to the pair of blocks, weights the code with the set weight, and thereafter performs the majority vote.

Figure 3:
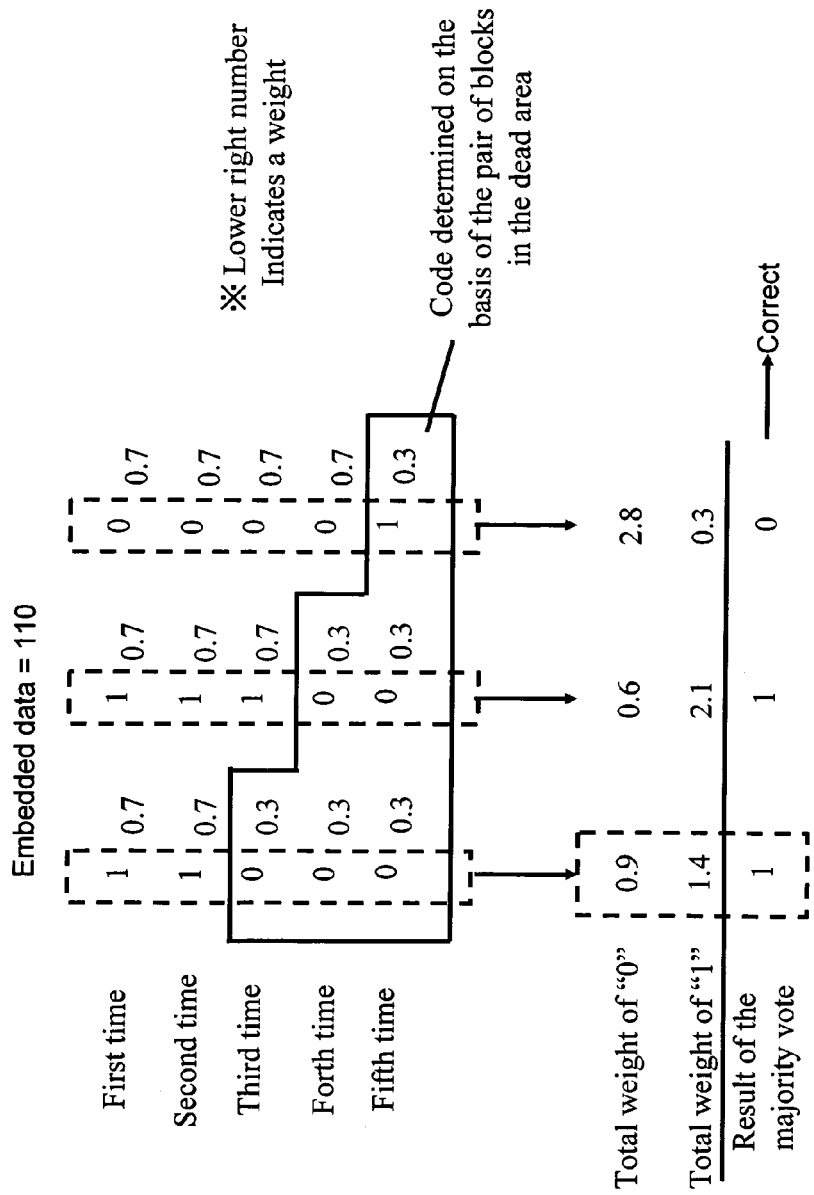
FIG. 3 is a diagram for illustrating processing of the majority vote with the weighting.

FIG. 3 is a diagram for illustrating the processing upon performing the weighting and the majority vote. In an example shown in FIG. 3, the weight out of the dead region is "0.7", and the weight within the dead region is "0.3". Referring to FIG. 3, at the most significant bit, the total of weight is 3×0.3=0.9 because the number of 0 is 3 and the weight is 0.3. On the other hand, at the most significant bit, the total of weight is 2×0.7=1.4 because the number of 1 is 2 and the weight is 0.7. Then, as compared 0.9 with 1.4, the result of the majority vote is "1" corresponding to 1.4 larger than 0.9. The majority vote is performed to other bits, and a series of codes serving as the final result of the majority vote are determined (a series of codes are "110" in the example shown in FIG. 3).

Subsequently, the decoding unit 180 determines, on the basis of the error correction code included in a series of codes, whether or not the error correction can be executed. If it is determined that the error correction using the error correction code cannot be executed, the decoding unit 180 outputs an error to an output device (not shown).

On the other hand, if it is determined that the error correction using the error correction code can be executed, the decoding unit 180 executes the error correction on the basis of the error correction code, outputs a series of codes subjected to the error correction to the output device. Further, the decoding unit 180 outputs, to the updating processing unit 190, the data on the left and right pixel values corresponding to the code of which the error correction is not necessary and the data on the left and right pixel values corresponding to the code subjected to the error correction from among a series of codes.

The updating processing unit 190 is a processing unit that updates the data 170*a* on the correct-solution frequency stored in the storing unit 170. Specifically, upon obtaining the data on the left and right pixel values corresponding to the code of which the error correction using the decoding unit 180 is not necessary, the updating processing unit 190 adds a predetermined value to the number Cij of times of correct solution corresponding to the data on the left and right pixel values, and further adds a predetermined value to the number Nij of obtaining times corresponding to the data on the left and right pixel values.

Further, upon obtaining the data on the left and right pixel values corresponding to the code subjected to the error correction using the decoding unit 180, the updating processing unit 190 adds a predetermined value to the number Nij of obtaining times corresponding to the data on the left and right pixel values.

Figure 4:
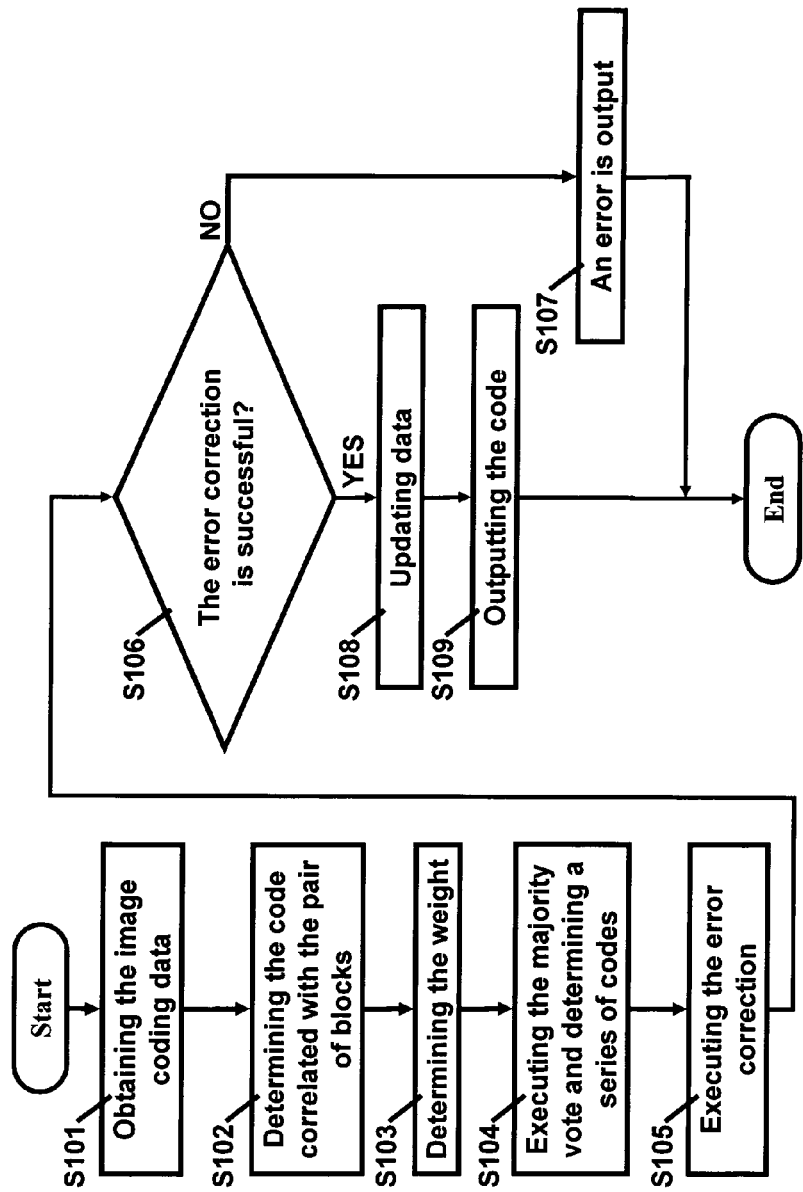
FIG. 4 is a flowchart showing a processing sequence of the image processing apparatus according to the first embodiment.

Next, a description will be given of the processing sequence of the image processing apparatus 100 according to the first embodiment. FIG. 4 is a flowchart showing the processing sequence of image processing apparatus 100 according to the first embodiment. Referring to FIG. 4, in the image processing apparatus 100, the image cut-out unit 110 obtains the image coding data (in step S101). The comparing unit 160 determines the code correlated with the pair of blocks via the block dividing unit 120, the block extracting unit 130, and the averaging unit 140 on the basis of the data stored in the registers 150*a* and 150*b* (the data on the average density of the left side and the data on the average density of the right side) (in step S102).

Subsequently, the decoding unit 180 determines the weight from the data on the correct-solution frequency corresponding to the pair of blocks (in step S103). Further, the decoding unit 180 executes the majority vote by reflecting the weight to the code, and determines a series of codes embedded to the image (in step S104).

Further, the decoding unit 180 executes the error correction on the basis of the error correction code included in a series of codes (in step S105), and determines whether or not the error correction is successful (in step S106). If it is determined that the error correction is not successful (NO in step S106), an error is output (in step S107).

On the other hand, if it is determined that the error correction is successful (YES in step S106), the updating processing unit 190 updates the data on the correct-solution frequency corresponding to the amount of characteristics of the pair of blocks (in step S108). Further, the decoding unit 180 outputs the code extracted from the image coding data (in step S109).

As mentioned above, the code is weighted on the basis of the data on the correct-solution frequency of the pair of blocks and the majority vote is thereafter performed, thereby precisely executing the decoding.

Figure 5:
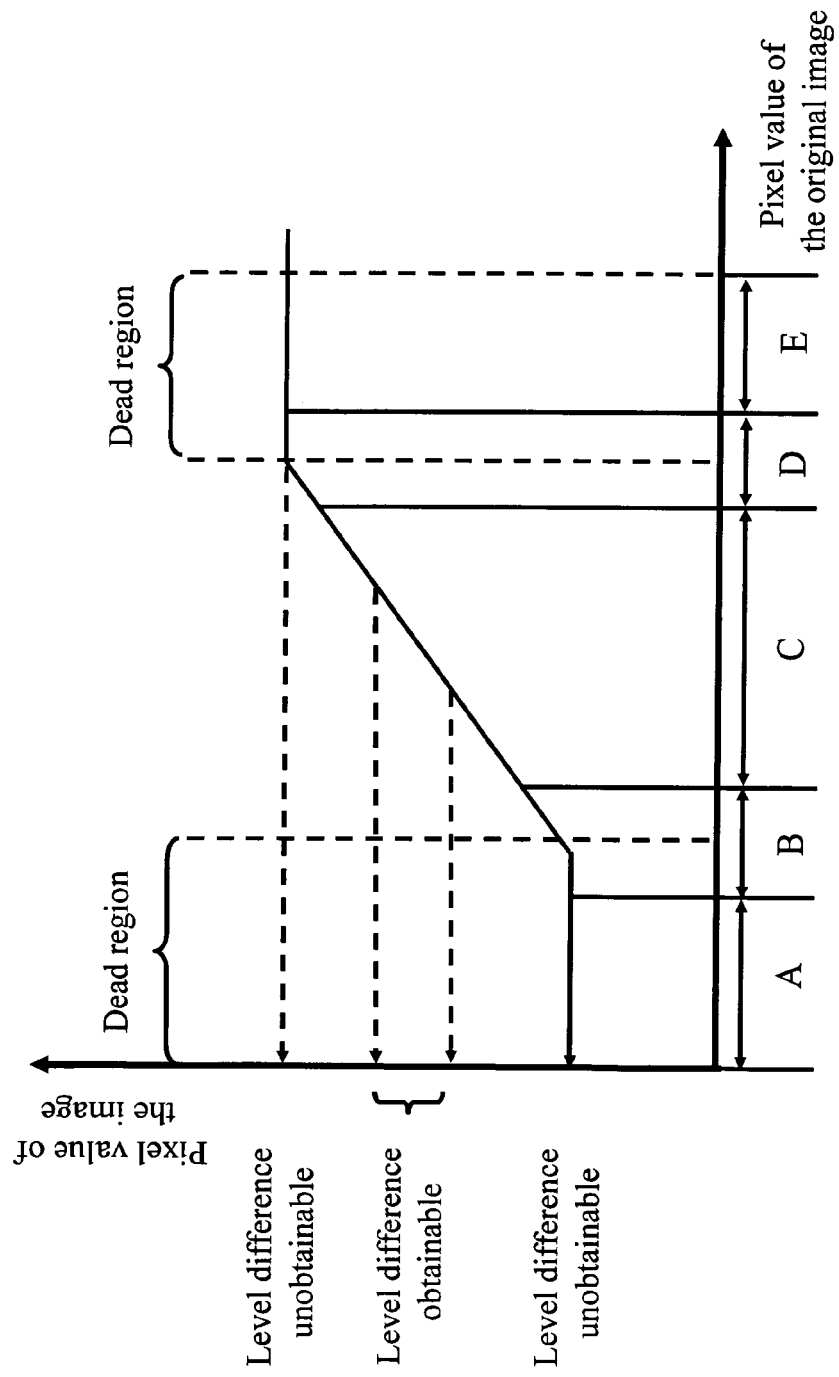
FIG. 5 is a diagram for illustrating a method for setting an initial value of the data on the correct-solution frequency.

Next, a description will be given of a method for setting an initial value of the data 170*a* on the correct-solution frequency according to the first embodiment. Although the initial value of the data 170*a* on the correct-solution frequency may be set in any manner, it can be set on the basis of a corresponding relationship between the pixel value of the original image and the pixel value of the image input to the image processing apparatus 100. FIG. 5 is a diagram for illustrating the method for setting the initial value of the data on the correct-solution frequency.

Referring to FIG. 5, when the pixel value of the image input to the image processing apparatus 100 is included in an area A, the data on the number of times of correct solution of the data on the correct-solution frequency and the data on the number of obtaining times are set so that the correct-solution frequency of the pixel value corresponding to the area A is 0. Incidentally, the pixel value of the image corresponds to the abscissa in FIG. 5. For example, when a pixel value R1 (refer to FIG. 2) is included in the area A, columns C11 to Cn1 corresponding to the pixel value R1 are set as 0 and N11 to Nn1 are set as 1.

When the pixel value of the image input to the image processing apparatus 100 is included in an area B, the data on the number of times of correct solution of the data on the correct-solution frequency and the data on the number of obtaining times are set so that the correct-solution frequency of the pixel value corresponding to the area B is 0.5. When the pixel value of the image input to the image processing apparatus 100 is included in an area C, the data on the number of times of correct solution of the data on the correct-solution frequency and the data on the number of obtaining times are set so that correct-solution frequency of the pixel value corresponding to the area C is set as 1.

When the pixel value of the image input to the image processing apparatus 100 is included in an area D, the data on the number of times of correct solution of the data on the correct-solution frequency and the data on the number of obtaining times are set so that the correct-solution frequency of the pixel value corresponding to the area D is set as 0.5. When the pixel value of the image input to the image processing apparatus 100 is included in an area E, the data on the number of times of correct solution of the data on the correct-solution frequency and the data on the number of obtaining times are set so that the correct-solution frequency of the pixel value corresponding to the area E is set as 0.

The initial value of the data 170*a* on the correct-solution frequency is set on the basis of the corresponding relationship between the pixel value of the original image and the pixel value of the image input to the image processing apparatus 100, thereby improving the decoding performance.

As mentioned above, with the image processing apparatus 100 according to the first embodiment, upon obtaining the image to which a series of codes are embedded plural times, the image is divided into a plurality of blocks, and the data 170*a* on the correct-solution frequency indicating the correct-solution frequency of the code correlated with the pair of blocks is obtained from the storing unit 170 on the basis of the amount of characteristics of the blocks forming the pair of blocks. Moreover, the weight to the pair of blocks is determined on the basis of the data 170*a* on the correct-solution frequency, the majority vote is performed by weighting the code correlated with the pair of blocks, and a series of codes embedded to the image are determined. As a consequence, the errors after the majority vote can be reduced and the decoding performance can be improved.

Further, with the image processing apparatus 100 according to the first embodiment, the updating processing unit 190 updates the data 170a on the correct-solution frequency on the basis of the result of correcting the error of the code. Therefore, the learning of the correct-solution frequency advances each time when the decoding processing of the input image is successful, and the majority vote having a prior correct-result can be executed.

Incidentally, according to the first embodiment, the data structure of the data 170a on the correct-solution frequency is described with reference to FIG. 2. However, the data structure of the data 170a on the correct-solution frequency is not limited to this.

FIG. 6 is a diagram showing another data structure of the data on the correct-solution frequency. Referring to FIG. 6, the data on the correct-solution frequency includes an absolute Dk of the difference between the average pixel values forming the pair of blocks, a number Ck of times of the correct solution, and a number Nk of obtaining times where k is a counting number. When the decoding unit 180 determines the weight to the code on the basis of the data on the correct-solution frequency having the data structure shown in FIG. 6, the absolute of the difference between the average pixel values of adjacent blocks is calculated from the data on the left and right pixel values obtained from the comparing unit 160, and the correct-solution frequency corresponding to the calculated absolute is determined as the weight to the code.

That is, if the absolute of the difference between the average pixel values of the adjacent blocks is Dk, the weight to the code is as follows.

$$\text{Weight} = Ck/Nk$$

When the pixel value of the image obtained from the input device is included within the dead region shown in FIG. 10, as compared with the difference in the average pixel values of the adjacent blocks in the embedding, the difference in the average pixel values obtained from the input image is obtained to be narrow due to narrow dead region and dynamic range, and the difference in the average pixel values can be zero or can be inverted under the influence such as noise. As mentioned above, since the average pixel value is correlated with the correct-solution frequency, the correct-solution frequency for the difference in the average pixel values can be used.

The data on the correct-solution frequency shown in FIG. 2 uses the average pixel values of two blocks, and has thus the amount of information larger than that upon using the difference in the average pixel values of the blocks (refer to FIG. 6). In this case, the correct-solution frequency can be held with high precision.

On the other hand, the data on the correct-solution frequency shown in FIG. 6 has a one-dimensional table, and can have the size of the table smaller than the size of the two-dimensional table shown in FIG. 2. Therefore, the data in this case is effective upon limiting the available storage capacity, such as the integration to the device.

Further, with the image processing apparatus 100 according to the first embodiment, the decoding unit 180 determines the weight corresponding to the pair of blocks on the basis of the data 170a on the correct-solution frequency, and the majority vote is performed by weighting the code with the determined weight. The present technique is not limited to this. For example, a series of codes embedded to the image coding data may be determined by using only the code obtained from the pair of blocks having the correct-solution frequency of a threshold or more.

That is, the decoding unit 180 excludes the code of the pair of blocks having the correct-solution frequency less than the threshold of the data 170a on the correct-solution frequency, and performs the majority vote by using only the code of the pair of blocks having the correct-solution frequency of the threshold or more, and the code embedded to the image coding data is determined. As mentioned above, the majority vote is executed by using only the code of the pair of blocks having the correct-solution frequency of the threshold or more, thereby improving the decoding performance.

A signal of the image processing apparatus has a higher reliability range and a lower reliability range. So the image processing apparatus weighs each digit value of each of the block pairs. Regardless of a characteristic of the image processing apparatus, the embodiment enables the image processing apparatus to decide a new digit value of associated pairs of blocks high probability.

Second Embodiment

Next, a description will be given of the outline and features of an image processing apparatus according to the second embodiment. With the image processing apparatus according to the second embodiment, upon obtaining the image to which a series of codes are embedded plural times, the image is divided into a plurality of blocks, and a series of codes are detected on the basis of the amount of characteristics of the individual blocks forming the pair of blocks by executing the majority vote without the weighting. Further, when the detected code is an erroneous one, information on the correct-solution frequency of the code correlated with the pair of blocks is obtained, and the majority vote is executed by weighting the code correlated with the pair of blocks on the basis of the information on the correct-solution frequency, thereby determining a series of codes embedded to the image.

As mentioned above, with the image processing apparatus according to the second embodiment, first of all, the decoding is performed without the majority vote using the weighting. Only when the decoding fails, the majority vote is performed on the basis of the information the correct-solution frequency, thereby determining the code. Therefore, a series of codes can be accurately extracted from the image while holding at least the decoding performance.

Figure 7:
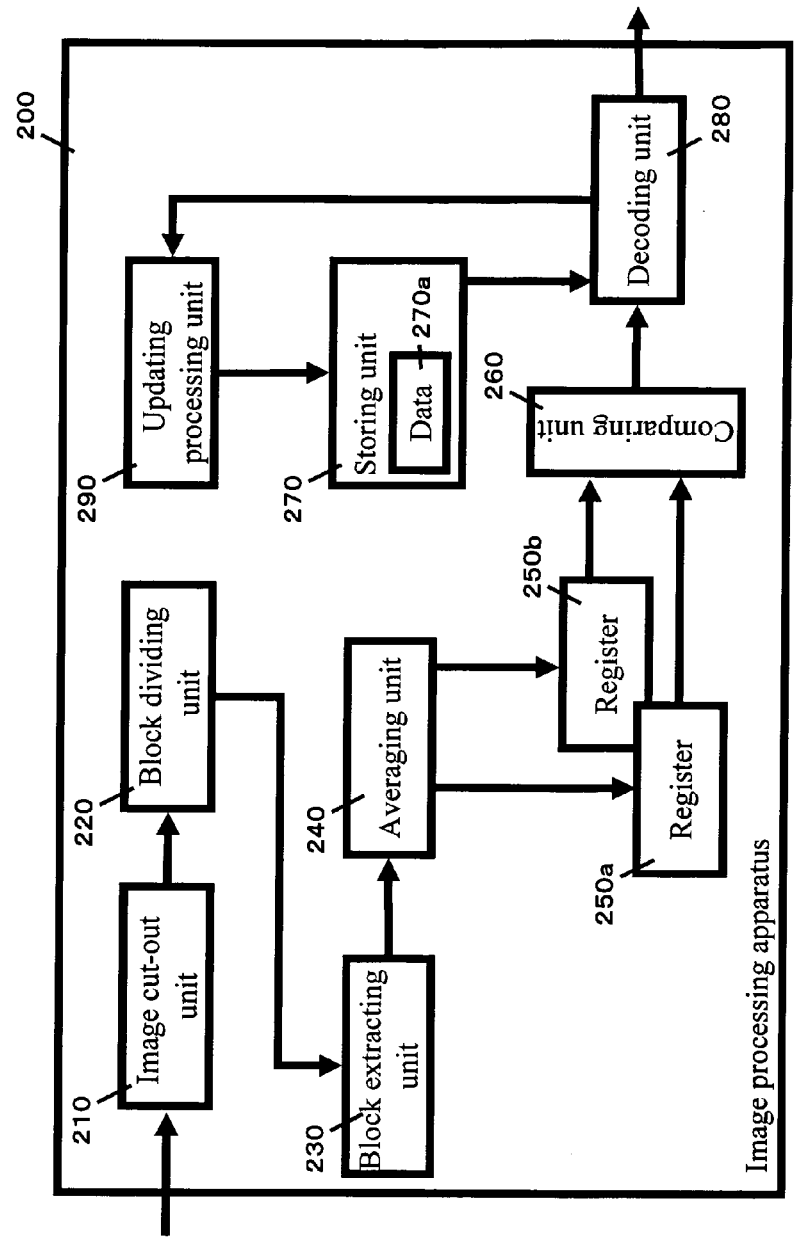
FIG. 7 is a functional block diagram showing the structure of an image processing apparatus according to the second embodiment.

Next, a description will be given of the structure of the image processing apparatus according to the second embodiment. FIG. 7 is a functional block diagram showing the structure of the image processing apparatus according to the second embodiment. Referring to FIG. 7, an image processing apparatus 200 comprises: an image cut-out unit 210; a block dividing unit 220; a block extracting unit 230; an averaging unit 240; registers 250a and 250b; a comparing unit 260; a storing unit 270; a decoding unit 280; and an updating processing unit 290.

Among the components, a description of the image cut-out unit 210, block dividing unit 220, block extracting unit 230, averaging unit 240, registers 250a and 250b, comparing unit 260, storing unit 270, and updating processing unit 290 is the same as that of the image cut-out unit 110, block dividing unit 120, block extracting unit 130, averaging unit 140, registers 150a and 150b, comparing unit 160, storing unit 170, and updating processing unit 190, as mentioned above with reference to FIG. 1, and is therefore omitted.

The decoding unit 280 is a processing unit that determines a series of codes embedded to the image coding data on the basis of the code obtained from the comparing unit 260, the data on the left and right pixel values, and data 270*a* on the correct-solution frequency of the storing unit 270. Incidentally, unlike the decoding unit 180 according to the first embodiment, the decoding unit 280 temporarily performs the majority vote without the weighting and determines a series of codes embedded to the image coding data. Further, when the data embedded to the image coding data is not determined by the majority vote without the weighting and the decoding fails, similarly to the decoding unit 180 according to the first embodiment, the majority vote is executed with the weighting to the code, and a series of codes embedded to the image coding data are determined.

Herein, a specific description will be given of processing of the decoding unit 280. First, the decoding unit 280 sequentially obtains the codes from the comparing unit 260, and stores the codes to a temporary storing unit (not shown) for each of a series of codes. For example, upon storing the code on one series to the temporary storing unit, the decoding unit 280 stores the codes and the data on the left and right pixel values correlation therewith.

Further, the decoding unit 280 performs the majority vote on the basis of a series of codes without using the weight to the pair of blocks, and determines a series of codes as the result of the majority vote. The decoding unit 280 determines on the basis of the error correction code included in a series of codes whether or not the error correction can be executed.

When the correction can be executed with the error correction code, the decoding unit 280 executes the error correction on the basis of the error correction code. Further, the decoding unit 280 outputs, to the output device, a series of codes subjected to the error correction. Furthermore, the decoding unit 280 outputs, to the updating processing unit 290, the data on the left and right pixel values corresponding to the code of which the error correction is not necessary and the data on the left and right pixel values corresponding to the code subjected to the error correction, from among a series of codes.

On the other hand, when the data embedded to the image coding data is not determined from the result of the majority vote without the weighting, the decoding unit 280 compares the data on the left and right pixel values correlated with the code with the data on the number of times of correct solution of the data 270*a* on the correct-solution frequency and the data on the number of obtaining times, thereby calculating the correct-solution frequency of the code. According to the second embodiment, the decoding unit 280 sets the correct-solution frequency as the weight to the pair of blocks, weights the code with the determined weight, and thereafter performs the majority vote.

Subsequently, the decoding unit 280 determines on the basis of the error correction code included in a series of codes whether or not the error correction can be executed. If it is determined that the error correction cannot be executed by using the error correction code, the decoding unit 280 outputs the error to the output device.

On the other hand, if it is determined that the error correction can be executed by using the error correction code, the decoding unit 280 executes the error correction on the basis of the error correction code, and outputs, to the output device, a series of codes subjected to the error correction. Further, the decoding unit 280 outputs, to the updating processing unit 290, the data on the left and right pixel values corresponding to the code of which the error correction is not necessary and the data on the left and right pixel values corresponding to the code subjected to the error correction, among from a series of codes.

Figure 8B:
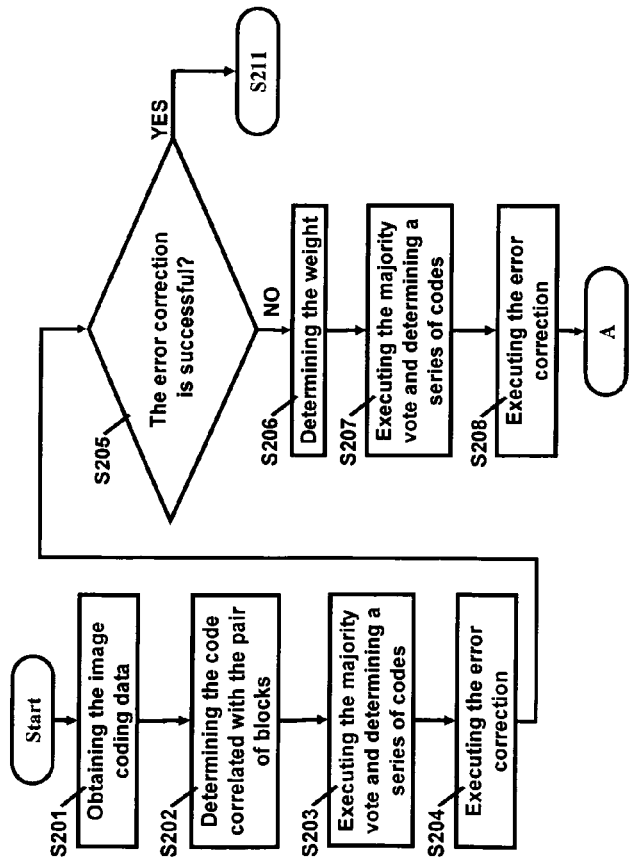
FIGS. 8A and 8B are flowcharts showing a processing sequence of the image processing apparatus according to the second embodiment.
Figure 8A:
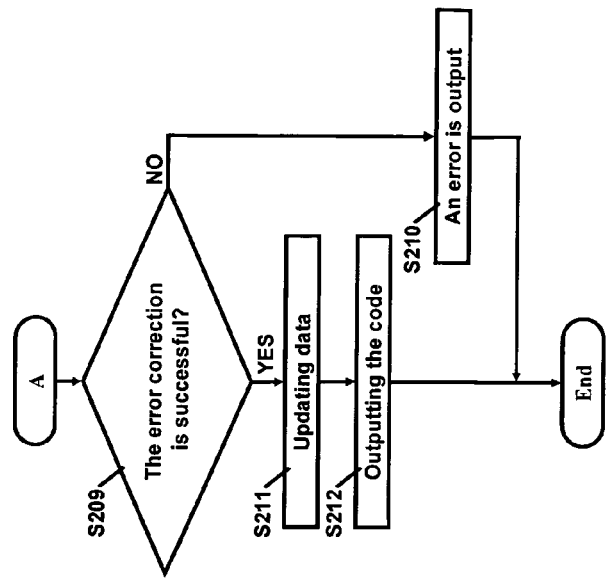

Next, a description will be given of the processing sequence of the image processing apparatus 200 according to the second embodiment. FIGS. 8A and 8B are flowcharts showing the processing sequence of the image processing apparatus 200 according to the second embodiment. Referring to FIGS. 8A and 8B, with the image processing apparatus 200, the image cut-out unit 210 obtains the image coding data (in step S201). The comparing unit 260 determines via the block dividing unit 220, the block extracting unit 230, and the averaging unit 240 on the basis of the data stored in the registers 250*a* and 250*b*, whether or not the code is correlated with the pair of blocks (in step S202). Herein, the data stored in the registers 250*a* and 250*b* includes the data on the average density of the left side and the data on the average density of the right side.

Subsequently, the decoding unit 280 executes the majority vote, and determines the code embedded to the image (in step S203). The decoding unit 280 executes the error correction on the basis of the error code included in a series of codes (in step S204), and determines whether or not the error correction is successful (in step S205). Further, if it is determined that the error correction is successful (YES in step S205), the processing advances to step S211.

On the other hand, if it is determined that the error correction is not successful (NO in step S205), the decoding unit 280 determines the weight from the data on the correct-solution frequency corresponding to the pair of blocks (in step S206). Subsequently, the decoding unit 280 executes the majority vote by reflecting the weight to the code, and determines whether or not the code is one of a series of codes embedded to the image (in step S207).

The decoding unit 280 executes the error correction on the basis of the error code included in a series of codes (in step S208), and determines whether or not the error correction is successful (in step S209). If it is determined that the error correction is not successful (NO in step S209), the decoding unit 280 outputs an error (in step S210).

On the other hand, if it is determined that the error correction is successful (YES in step S209), the updating processing unit 290 updates the data on the correct-solution frequency corresponding to the amount of characteristics of the pair of blocks (in step S211). Further, the decoding unit 280 outputs the code extracted from the image coding data (in step S212).

As mentioned above, the decoding unit 280 temporarily performs the majority vote without the weighting, and decodes the data. Only when the decoding fails, the weighting is performed, the majority vote is then performed, and a series of codes are determined, thereby ensuring the decoding performance.

As mentioned above, with the image processing apparatus 200 according to the second embodiment, upon obtaining the image to which a series of codes are embedded plural times, the image is divided into a plurality of blocks, the majority vote without the weighting is performed on the basis of the amount of characteristics of the blocks forming the pair of blocks, and a series of codes are detected. Further, when the detected code is an erroneous one, the decoding unit 280 obtains the information on the correct-solution frequency of the code correlated with the pair of blocks, performs the majority vote by weighting the code correlated with the pair of blocks on the basis of the information on the correct-solution frequency, and determines whether or not the code is a series of codes embedded to the image. Therefore, at least by holding the decoding performance, a series of codes can be accurately extracted from the image.

In the processing described according to the first and second embodiments, it is possible to manually execute all or a part of the described processing that is automatically executed. Alternatively, it is possible to automatically execute, by a well-known method, all or a part of the described processing that is manually executed. In addition, the processing sequence, control sequence, specific names, and information including various data and parameters described in the document and drawings can be arbitrarily changed except for the note.

Further, the components in the image processing apparatuses 100 and 200 in FIGS. 1 and 7 are functionally conceptual and do not need to be physically structured as shown in the drawings. That is, the disintegration and integration of the devices are not limited to those shown in the drawings and all or a part of the devices can be functionally or physically disintegrated and integrated on the basis of an arbitrary unit, depending on various loads and using situations. Further, all or a part of the processing functions performed by the devices can be realized by a CPU and a program analyzed and executed by the CPU, or by hardware using the wired logic.

Figure 9:
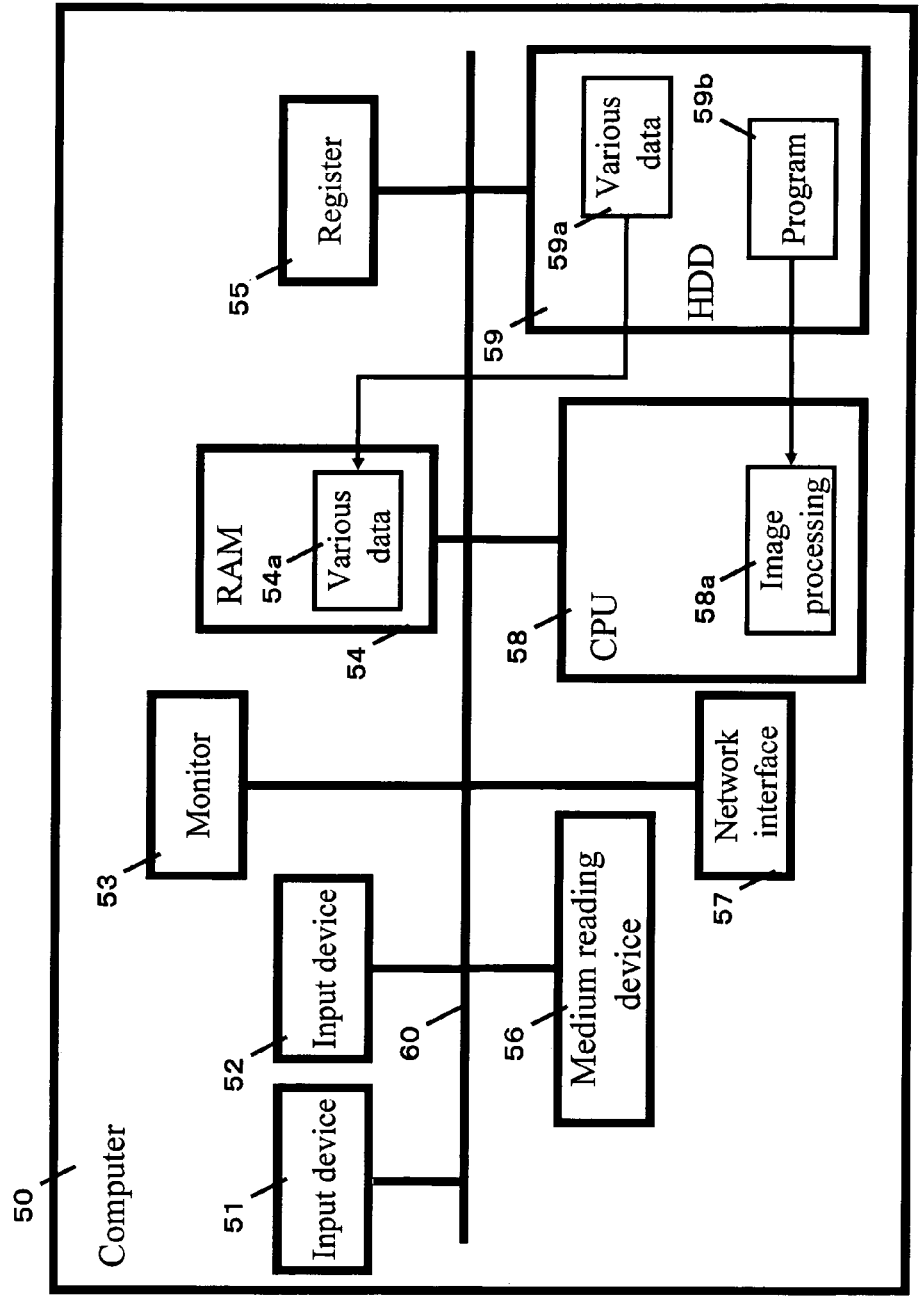
FIG. 9 is a diagram showing the hardware structure of a computer forming the image processing apparatus shown in FIG. 1 or 7.

FIG. 9 is a diagram showing the hardware structure of a computer forming the image processing apparatus shown in FIG. 1 or FIG. 7. A computer 50 comprises: an input device (camera, etc.) 51 that receives an input of the image data; an input device 52 that receives the input of the data from a user; a monitor 53; a RAM (Random Access Memory) 54; a register 55; a medium reading device 56 that reads a program from a recording medium for recording various programs; a network interface 57 that receives and sends the data from/to another computer via a network; a CPU (Central Processing Unit) 58, and an HDD (Hard Disk Drive) 59, which are connected via a bus 60.

Further, the HDD 59 stores an image processing program 59b that exhibits the same functions as those of the image processing apparatus 100 (200). The CPU 58 reads the image processing program 59b from the HDD 59 and executes the program 59b, thereby starting image processing 58a that realizes the functions of the function units in the image processing apparatus 100 (200). The image processing 58a corresponds to the image cut-out unit 110, the block dividing unit 120, the block extracting unit 130, the averaging unit 140, the comparing unit 160, the decoding unit 180 (or 280 in FIG. 7), and the updating processing unit 190, which are shown in FIG. 1.

Furthermore, the HDD 59 stores various data 59a corresponding to the data stored to the storing unit 170 in the image processing apparatus 100. The various data 59a corresponds to the data on the correct-solution frequency shown in FIGS. 1 and 7.

The CPU 58 stores the various data 59a to the HDD 59, reads the various data 59a from the HDD 59, stores the read data to the RAM 54, and determines the code embedded to the image coding data by using the various data 54a stored in the RAM 54.

According to the embodiments, the information on the correct-solution frequency indicating the correct-solution frequency of the code correlated with the pair of blocks is obtained on the basis of the amount of characteristics of the individual blocks forming the pair of blocks, the weighting to the pair of blocks is determined on the basis of the information on the correct-solution frequency, the code correlated with the pair of blocks is weighted, the majority vote is performed, and a series of codes embedded to the image are determined. Therefore, the errors after the majority vote can be reduced, thereby improving the decoding performance.

Further, according to the embodiments, a series of codes embedded to the image include the correction codes for correcting the series of codes, it is determined on the basis of the correction code included in the series of codes whether or not the series of codes can be corrected, and the information on the correct-solution frequency is updated on the determining result. Therefore, the correct-solution frequency corresponding to the pair of blocks can be learned, thereby improving the decoding performance.

Furthermore, according to the embodiments, the initial value of the information on the correct-solution frequency is set on the basis of a corresponding relationship between the pixel value of the original image and the pixel value of the image that is input to the image processing apparatus. Accordingly, the learning of the correct-solution frequency can be fast.

In addition, according to the embodiments, a series of codes embedded to the image are determined by using only the code obtained from the pair of blocks having the correct-solution frequency of a threshold or more. As a consequence, it is possible to perform the majority vote by using the pair of blocks with high probability.

In addition, according to the embodiments, the majority vote is temporarily performed without the weighting and, if the decoding fails, the majority vote with the weighting is executed. As a consequence, at least the decoding performance can be ensured and the decoding performance can be further improved.

As mentioned above, the image processing apparatus and image processing method according to the embodiments are advantageous for devices for extracting the code embedded to the image and, in particular, are suitable to improve the decoding performance without the influence of the pixel value of the image.

What is claimed is:

1. A method of obtaining information included in an input image, the input image including a plurality of codes, each of the codes comprising a plurality of digits, the method executed by a computer, comprising:
    dividing the input image into a plurality of pairs of blocks;
    reading out correct solution frequency data including an absolute value of a difference between characteristic values forming the pairs of blocks, an obtaining number indicating a number of times for obtaining left and right pixel values, and a correct solution frequency number that advances each time a decoding processing of the input image is successful;
    determining, by the computer, a digit value of each of the block pairs on a basis of the absolute value of the difference of a degree of the characteristic values between adjacent blocks in each of the block pairs and a weighting value of the digit value on a basis of a correct solution frequency determined by the obtaining number and the correct solution frequency number;
    determining, by the computer, the weighted digit value corresponding to the pairs of blocks by calculating the determined correct solution frequency and the determined digit value;
    deciding, by the computer, a new digit value of associated pairs of blocks on a basis of a majority of the weighed digit values of the associated pairs of the blocks; and
    repeating, by the computer, the deciding in other associated pairs of the blocks to determine a code.

2. The method of claim 1, wherein the code contains an error correcting code.

3. The method of claim 2, further comprising
    executing error correction on a basis of the error correcting code.

4. The method of claim 1, further comprising
    obtaining image coding data from an input device.

5. The method of claim 1, further comprising
    outputting the code extracted from the image.

6. The method of claim 1, wherein dividing further comprises
extracting the plurality of pairs of blocks following a bit shift of the code as a decoding target.

7. An apparatus for obtaining information included in an input image, the input image including a plurality of codes, each of the codes comprising a plurality of digits, the apparatus comprising:
a storage to store correct solution frequency data including an absolute value of a difference between characteristic values forming pairs of blocks, an obtaining number indicating a number of times for obtaining left and right pixel values, and a correct solution frequency number that advances each time a decoding processing of the input image is successful; and
a processor to execute:
dividing the input image into a plurality of pairs of blocks;
determining a digit value of each of the block pairs on a basis of the absolute value of the difference of a degree of the characteristic values between adjacent blocks in each of the block pairs, and a weighting value of the digit value on a basis of a correct solution frequency determined by the obtaining number stored in the storage and the correct solution frequency number stored in the storage;
determining, by the processor, the weighted digit value corresponding to the pairs of blocks by calculating the determined correct solution frequency and the determined digit value;
deciding a new digit value of associated pairs of blocks on a basis of a majority of the weighed digit values of the associated pairs of the blocks; and
repeating the deciding in other associated pairs of the blocks to determine a code.

8. The apparatus of claim 7, wherein the code contains an error correcting code.

9. The apparatus of claim 8, further comprising
executing error correction on a basis of the error correcting code.

10. The apparatus of claim 7, wherein dividing further comprises
extracting the plurality of pairs of blocks following a bit shift of the code as a decoding target.

11. A non-transitory computer-readable recording medium that stores a computer program to control an apparatus according to a process comprising:
dividing an input image into a plurality of pairs of blocks, the input image including a plurality of codes, each of the codes comprising a plurality of digits;
reading out correct solution frequency data including an absolute value of a difference between characteristic values forming the pairs of blocks, an obtaining number indicating a number of times for obtaining left and right pixel values, and a correct solution frequency number that advances each time a decoding processing of the input image is successful;
determining a digit value of each of the block pairs on a basis of the absolute value of the difference of a degree of the characteristic values between adjacent blocks in each of the block pairs and a weighting value of the digit value on a basis of a correct solution frequency determined by the obtaining number and the correct solution frequency number;
determining, the weighted digit value corresponding to the pairs of blocks by calculating the determined correct solution frequency and the determined digit value;
deciding a new digit value of associated pairs of blocks on a basis of a majority of the weighed digit values of the associated pairs of the blocks; and
repeating the deciding in other associated pairs of the blocks to determine a code.

12. The non-transitory computer-readable recording medium of claim 11, wherein the code contains an error correcting code.

13. The non-transitory computer readable recording medium of claim 12, further comprising
executing error correction on a basis of the error correcting code.

14. The non-transitory computer readable recording medium of claim 11, further comprising
obtaining image coding data from an input device.

15. The non-transitory computer readable recording medium of claim 11, further comprising
outputting the code extracted from the image.

16. The non-transitory computer readable recording medium of claim 11, wherein dividing further comprises
extracting the plurality of pairs of blocks following a bit shift of the code as a decoding target.

* * * * *